May 7, 1929.  L. D. LOVEKIN  1,712,116

EMERGENCY PLUG SHUT-OFF VALVE

Filed Oct. 20, 1927

Witness:
Walter Chinn.

Inventor
Luther D. Lovekin
by
Attorney

Patented May 7, 1929.

1,712,116

UNITED STATES PATENT OFFICE.

LUTHER D. LOVEKIN, OF WYNNEWOOD, PENNSYLVANIA.

EMERGENCY PLUG SHUT-OFF VALVE.

Application filed October 20, 1927. Serial No. 227,390.

My invention relates to protection devices intended for use in boilers which are heated by gaseous or liquid fuel in which the fuel is automatically cut off from the burner when the temperature inside the boiler reaches a dangerous height, and is a development of the subject matter of my invention disclosed in U. S. Patent 1,628,675 entitled "Automatic shut-off valve", dated May 17, 1921.

The main purpose of my invention is to cheapen and simplify supporting structure of the valve stem and fusible unit.

A further purpose is to lessen the number of parts needed to support the valve stem and heat element.

A further purpose is to insert and replace a heat element under a valve stem without taking apart the body structure of the valve.

A further purpose is to use a bored and outwardly counterbored plug for giving a guiding support to a valve stem and a bored and preferably inwardly counterbored second plug to present a heat element under the stem.

Further purposes will appear in the specification and in the claims.

I have preferred to illustrate my invention by one form only, selecting a form that is practical and inexpensive and which well illustrates the principles involved.

In the drawings similar numerals indicate like parts.

Figure 1:
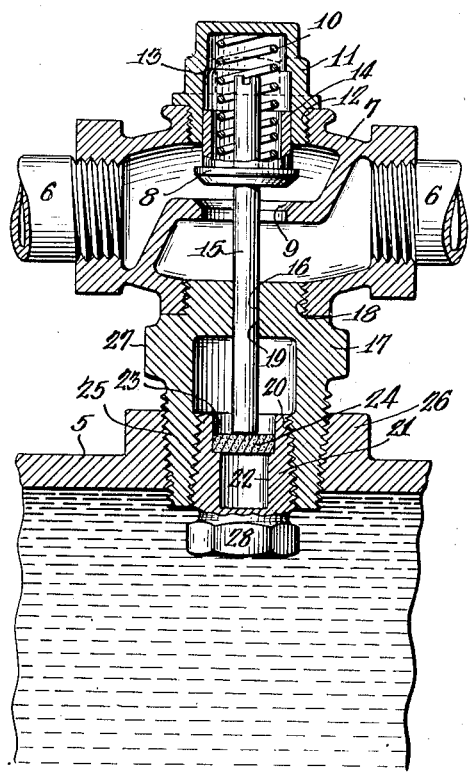
Figure 1 is a vertical longitudinal section through a preferred form of my valve, shown applied to a boiler.
Figure 2:
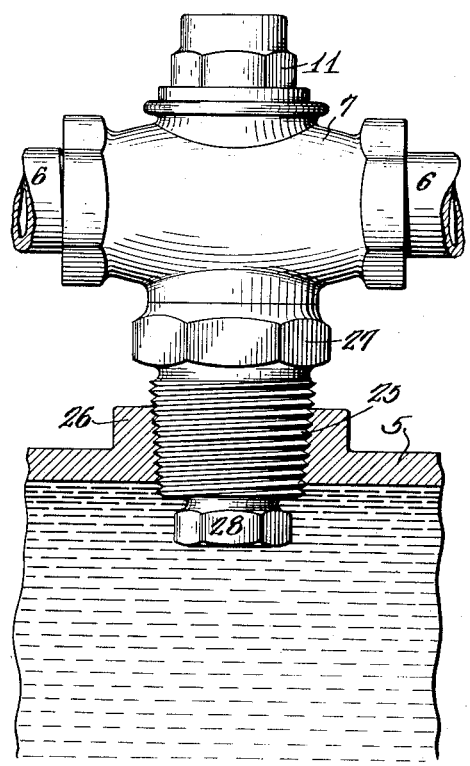
Figure 2 is a view corresponding generally to Figure 1 but showing the valve in longitudinal elevation.

My invention is intended to be applied to a boiler or tank such as 5, that is heated by the combustion of gaseous or liquid fuel which passes through a fuel supply pipe 6 and through my cutoff device 7, shown here as a globe type of valve.

The valve element 8 is spring-pressed toward its seat 9 by a spring 10 compressed between the valve element and the interior of a cap or cover 11 screwed into the valve body at 12.

The interior 13 of the cap forms a guiding wall for the valve skirt 14, the movable valve element being thus guided at its upper end by the cap.

The valve stem 15 is guided at any intermediate point of its length at 16 so as to keep the valve alined with its seat and to ensure proper registration of the valve and seat.

My invention is directed chiefly at the mount of the movable valve element, including that of the heat element which is adapted to be inserted and replaced without removing the body of the mount from the valve.

A plug 17 is removably threaded at 18 into the body of the valve. It is longitudinally bored at 19 to fit the valve stem, and counterbored from its outer end at 20 to receive a second plug 21.

The second plug is threaded into the counterbore of the first and the bored portion of the first plug forms the guide for the valve stem.

The second plug 21 is bored at 22 axially for some distance from its inner end and preferably counterbored at 23 to provide a suitable seat for the heat element 24, the bore 22 being of somewhat larger diameter than that of the stem 15.

The plug member 17 is provided with an outer shank 25 that threads into a boss 26 of the boiler so that the inner plug carrying the heat element preferably extends into the boiler.

Suitable wrench holds are provided at 27 between the threaded portions of the main plug and at 28 at the outer end of the smaller plug.

While I prefer to use a heat element in the form of a disc supported above a well 22, optionally other forms of fusible plug may be used adapted to fuse at the desired temperature to permit closure of the valve.

The somewhat more advantageous disc-type of heat element requires less material and fails at lower temperatures and permits a snap-action of the valve due to a suddenness of failure that is much less pronounced if the plug fills the space beneath the bottom of the stem.

In view of my disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a cut-off valve, a valve body having a laterally extending longitudinally bored shank for insertion into a boiler, a spring-pressed valve, a valve stem guided by the shank, a plug removably mounted in the outer end of the shank and a heat element presented by the plug against the end of the stem to maintain the valve normally open against spring pressure.

2. A cut-off valve having a valve element pressing toward closure and a stem carrying the valve, in combination with a laterally extending valve body shank surrounding the stem and adapted for insertion into a heater, a plug threaded into the outer end of the shank and a heat element presented by the plug against the outer end of the stem to support the stem so that the valve is normally open, failure of the heat element due to undesirably high temperature permitting movement of the stem to close the valve.

3. A cut-off valve having a valve element spring-pressed toward closure and a stem carrying the valve element, in combination with a laterally extending valve body shank surrounding and guiding the stem, counterbored at its end, and adapted for insertion into a boiler, a plug removably threaded into the counterbore of the shank and having a bore of larger diameter than that of the stem and a counterbore from its inner end and a disc heat-sensitive element mounted across the bore in the counterbore of the plug, presented by the plug against the end of the stem to hold the valve open and adapted to fail if subjected to undesirably high temperature.

4. A common mount for the stem of a cut-off valve and a heat element, adapted to control the operation of the stem, comprising a plug adapted to be threaded into the valve, bored to pass and guide the valve stem and counterbored from its outer end, a second plug threaded into the outer end of the first, and a heat-released retaining device for the valve stem carried by the second plug, the first plug having a threaded shank adapted to present the outer end of the second plug into a boiler.

5. A globe valve body having inlet and outlet compartments and a partition therebetween, and transversely alined openings in the outside walls of the body and in the partition, a movable valve member spring-pressed toward closure, comprising a stem and a disc adapted to be inserted through one of the outer openings into one of the compartments and to close the opening in the partition, a hollow plug threaded into the opening in the other compartment, at its inner end surrounding and guiding the extended end of the stem and counterbored at its outer end, a shank on the plug adapted for insertion into a boiler, a second plug in the counterbore of the first and a heat element presented by the second plug against the outer end of the stem to normally hold the stem in open position, and adapted to fail if subjected to undesirably high temperature to permit closure of the valve.

6. In a cut-off valve, a globe type of valve body having inlet and outlet compartments and a dividing partition therebetween and transversely alined openings through the outside wall of the outlet compartment, through the partition and through the outside wall of the inlet compartment respectively, a valve seat around the opening through the partition, a disc valve adapted to engage and close the opening in the partition, a stem for the disc, a cap supported by the body and threaded into one of said openings, a spiral spring compressed between the cap and the disc, pressing the valve toward closure, a plug screwed into the other opening at one end, adapted to thread into a boiler at the other end, surrounding and guiding the stem at its inner end and counterbored from its outer end, a second plug threaded into the outer end of the first and a heat element supported in the second plug and engaging the outer end of the stem to hold it in open position.

LUTHER D. LOVEKIN.